C. A. J. LINDSTROM.
SHAFT COUPLING.
APPLICATION FILED JUNE 4, 1907.
904,341.
Patented Nov. 17, 1908.
2 SHEETS—SHEET 1.
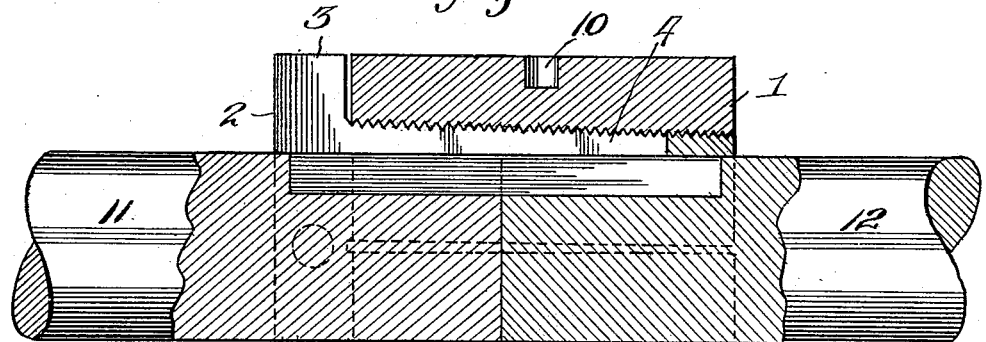
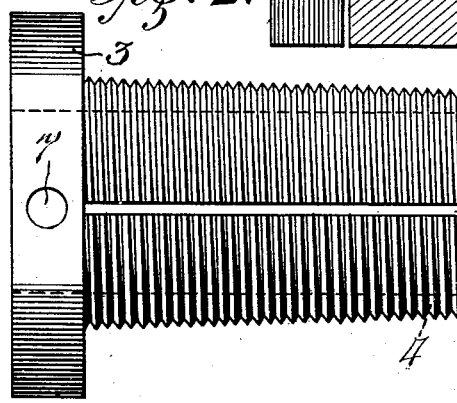
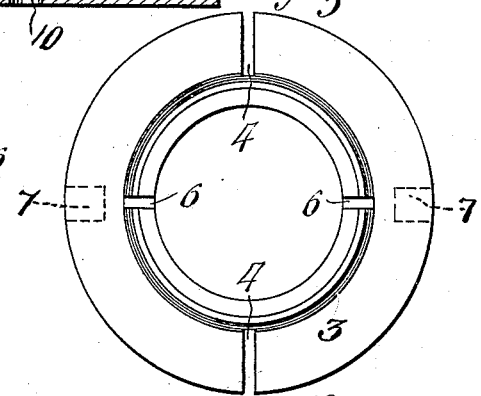
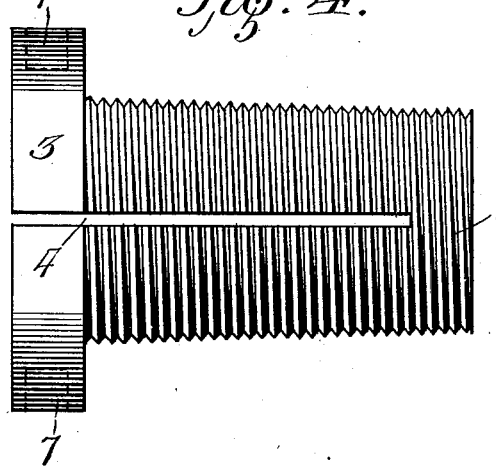
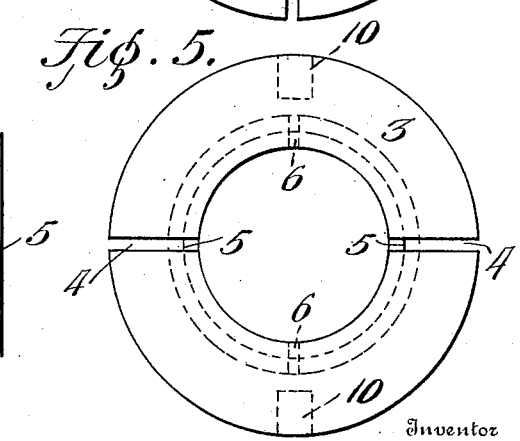
Inventor
Charles A. J. Lindstrom
Witnesses
Frank B. Hoffman
J. W. Garner
By Victor J. Evans
Attorney

C. A. J. LINDSTROM.
SHAFT COUPLING.
APPLICATION FILED JUNE 4, 1907.

904,341.

Patented Nov. 17, 1908.

2 SHEETS—SHEET 2.

Inventor
Charles A. J. Lindstrom

Witnesses
Frank B. Hoffman
J. W. Garner

By Victor J. Evans
Attorney

UNITED STATES PATENT OFFICE.

CHARLES A. J. LINDSTROM, OF TACOMA, WASHINGTON.

SHAFT-COUPLING.

No. 904,341.  Specification of Letters Patent.  Patented Nov. 17, 1908.

Application filed June 4, 1907. Serial No. 377,249.

*To all whom it may concern:*

Be it known that I, CHARLES A. J. LINDSTROM, a citizen of the United States, residing at Tacoma, in the county of Pierce and State of Washington, have invented new and useful Improvements in Shaft-Couplings, of which the following is a specification.

This invention is an improved coupling for coupling two shaft members end to end and for also locking a pulley, wheel, or other device to a shaft, and it consists in the construction, combination and arrangements of devices hereinafter described and claimed.

The object of my invention is to provide an improved coupling device of this character which, when applied to a shaft, presents a smooth surface concentric with the shaft which will not injure a person who may come in contact therewith when the shaft is in revolution; a further object being to provide a coupling device which may be readily applied to a shaft or detached therefrom, which is simple in construction, and which may be manufactured at small cost.

Figure 6:
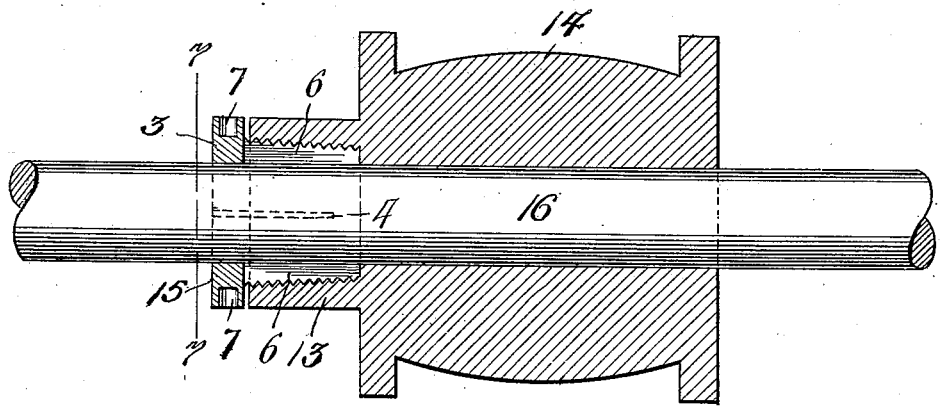
Figure 7:
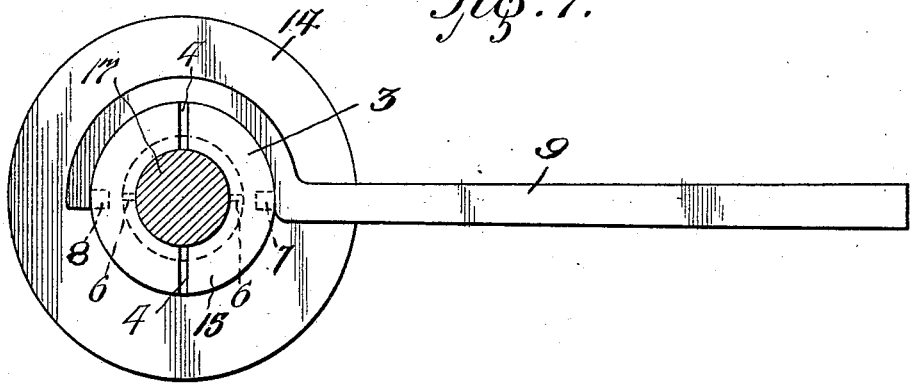

In the accompanying drawings, Figure 1 is a longitudinal sectional view of a coupling embodying my improvements, showing the same applied to the ends of two abutting shafts and connecting them together. Fig. 2 is a detail side elevation of the split sleeve. Fig. 3 is an end elevation of the same. Fig. 4 is a side elevation of the split sleeve taken at right angles to the view shown in Fig. 2. Fig. 5 is an opposite end elevation of the same from that shown in Fig. 3. Fig. 6 is a sectional view, showing my improved coupling device employed in connection with a shaft and a pulley, to secure the latter on the former. Fig. 7 is a transverse sectional view on the plane indicated by the line 7—7, of Fig. 6, and showing a spanner wrench applied to the split sleeve of the coupling.

My improved coupling comprises a clamping collar 1 and a split sleeve 2. The clamping collar is provided with a longitudinal bore tapered in one direction and screw threaded and the split sleeve is also tapered in one direction, is exteriorly screw threaded to engage the bore of the collar and is of suitable size to enable it to fit in the bore of the collar. Said split sleeve is provided on its outer end with a cylindrical head 3.

The head 3 is located at the enlarged end of the sleeve, and the latter is provided with a pair of diametrically opposite longitudinal slits or slots 4 which divide the sleeve longitudinally nearly from end to end, said slits extending from a point adjacent the reduced end 5 thereof to and through the enlarged end of the sleeve and the head 3, thus dividing the latter into substantially semi-cylindrical sections. The sleeve is also provided with a pair of longitudinal slits or slots 6, arranged diametrically opposite each other, and at right angles to the aforesaid slots or slits 4, the said slits 6 extending from the enlarged end of the sleeve at the inner end of the head 3 to and through the reduced end 5 of the sleeve, by which construction a split sleeve and head which may be formed of a single piece of material as a unitary article may be provided and the sleeve at the same time rendered uniformly expansible and contractible.

The head or enlarged portion 3 of the split sleeve is provided at suitable points with radial recesses 7 for engagement by the stud 8 of a spanner wrench 9, such as shown in Fig. 7, and by means of which such sleeve may be either held against rotation or turned. The clamping collar 1 into which the split sleeve extends is also provided with radial recesses 10 for engagement and operation by a similar wrench or other implement. By reference to Fig. 1, it will be observed that when the improved coupling devices are employed for connecting the proximate ends of a pair of shafts 11 and 12 together, the split sleeve will be placed on such shafts so as to cover the joint between them and partly overlap each of the shafts and the clamping collar will then be screwed on the sleeve and caused to compress the same into close binding engagement with the shaft, thus effectually locking the latter together. It will be understood that the compressing force of the clamping collar will be exerted on the split members of the split sleeve equally in all directions radially so that all parts of the split sleeve will be forced inwardly alike by the clamping collar and caused to bind with equal force against the contiguous portions of the surface of such shafts 11 and 12 so that the coupling devices will keep such shafts in alinement with each other.

In the form of my invention shown in Fig. 6, the clamping collar is shown, at 13, as an integral portion of a pulley or other sleeve element 14. The split sleeve 15, which is fitted on the shaft 16 with said pulley or sleeve element, has its tapered screw-threaded split portion engaged with the tapered internally threaded wall of such collar, by which it locks the pulley on the shaft.

Having thus described the invention, what I claim as new and desire to secure by Letters Patent is:

A coupling device comprising, in combination, a one-piece uniformly tapered externally screw-threaded sleeve provided with a circular head at its enlarged end, said sleeve also being provided with pairs of diametrically opposite longitudinal slits arranged at right angles to each other, the slits of one pair extending from the inner side of the head to and through the reduced end of the sleeve, and the slits of the other pair extending from a point near the reduced end of the sleeve to and through the head, thus rendering said sleeve uniformly contractible and expansible, and a one-piece clamping collar having a uniformly tapered screw threaded bore for the reception of the tapered portion of said sleeve, whereby the sleeve and collar are adapted to be connected together and the sleeve contracted to lock both the collar and sleeve to a shaft.

In testimony whereof, I affix my signature in presence of two witnesses.

CHARLES A. J. LINDSTROM.

Witnesses:
 GEO. H. ARMITAGE,
 H. R. STUTLER.